(12) United States Patent
Hwang et al.

(10) Patent No.: US 10,451,909 B2
(45) Date of Patent: Oct. 22, 2019

(54) LIQUID CRYSTAL DISPLAY PANEL AND METHOD OF MANUFACTURING THE SAME

(71) Applicant: Samsung Display Co., Ltd., Yongin-si (KR)

(72) Inventors: Seong Mo Hwang, Seongnam-si (KR); Jin Woo Park, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 66 days.

(21) Appl. No.: 15/285,664

(22) Filed: Oct. 5, 2016

(65) Prior Publication Data

US 2017/0168336 A1    Jun. 15, 2017

(30) Foreign Application Priority Data

Dec. 11, 2015 (KR) .......................... 10-2015-0177150

(51) Int. Cl.
*G02F 1/1335* (2006.01)
*G02F 1/1333* (2006.01)
(Continued)

(52) U.S. Cl.
CPC ........ *G02F 1/13338* (2013.01); *G02F 1/1337* (2013.01); *G02F 1/13439* (2013.01);
(Continued)

(58) Field of Classification Search
None
See application file for complete search history.

(56) References Cited

U.S. PATENT DOCUMENTS

| 8,289,457 B2 | 10/2012 | Hwang et al. |
| 8,367,488 B2 * | 2/2013 | Ichiryu ............... H01L 27/1266 257/57 |

(Continued)

FOREIGN PATENT DOCUMENTS

| KR | 10-2012-0014497 | 2/2012 |
| KR | 10-1165456 | 12/2012 |
| KR | 10-2015-0023728 | 3/2015 |

OTHER PUBLICATIONS

Partial European Search Report dated May 11, 2017, issued in European Patent Application No. 16191677.0.

*Primary Examiner* — Richard H Kim
(74) *Attorney, Agent, or Firm* — H.C. Park & Associates, PLC

(57) ABSTRACT

A liquid crystal display panel including a first substrate, a second substrate, and a liquid crystal layer disposed between the first substrate and the second substrate. The first substrate includes a first base substrate, a thin film transistor disposed on the first base substrate, a color filter disposed on the first base substrate, and a first alignment layer disposed on the thin film transistor and the color filter. The second substrate includes a second base substrate, a second alignment layer disposed on a first surface of the second base substrate, a touch electrode disposed on a second surface of the second base substrate, a connecting electrode disposed on the second surface, and a connecting line disposed on the second surface. The first surface faces the first substrate, and the second surface is opposite to the first surface. The touch electrode includes a crystallized indium tin oxide.

10 Claims, 20 Drawing Sheets

(51) Int. Cl.
*G06F 3/041* (2006.01)
*G06F 3/044* (2006.01)
*G02F 1/1337* (2006.01)
*G02F 1/1343* (2006.01)
*G02F 1/1362* (2006.01)

(52) U.S. Cl.
CPC .. *G02F 1/133345* (2013.01); *G02F 1/136209* (2013.01); *G06F 3/044* (2013.01); *G06F 3/0412* (2013.01); *G02F 2001/136222* (2013.01); *G02F 2201/12* (2013.01); *G02F 2201/50* (2013.01); *G06F 2203/04103* (2013.01); *G06F 2203/04111* (2013.01)

(56) References Cited

U.S. PATENT DOCUMENTS

| | | | |
|---|---|---|---|
| 2009/0016001 A1* | 1/2009 | Miyakawa | G02F 1/133555 361/679.21 |
| 2010/0122900 A1 | 5/2010 | Krasnov | |
| 2011/0141042 A1* | 6/2011 | Kim | G02F 1/13338 345/173 |
| 2011/0291994 A1* | 12/2011 | Kwak | G06F 3/044 345/176 |
| 2012/0241198 A1 | 9/2012 | Kajiya et al. | |
| 2014/0055690 A1 | 2/2014 | Song et al. | |
| 2014/0125624 A1* | 5/2014 | Park | G06F 3/041 345/174 |
| 2014/0240617 A1* | 8/2014 | Fukutome | G02F 1/13338 349/12 |
| 2014/0333850 A1* | 11/2014 | Kim | G06F 3/044 349/12 |
| 2015/0183932 A1 | 7/2015 | Katayama et al. | |
| 2015/0293630 A1* | 10/2015 | Ishizaki | G06F 3/044 345/174 |
| 2015/0331540 A1 | 11/2015 | Lee | |

* cited by examiner

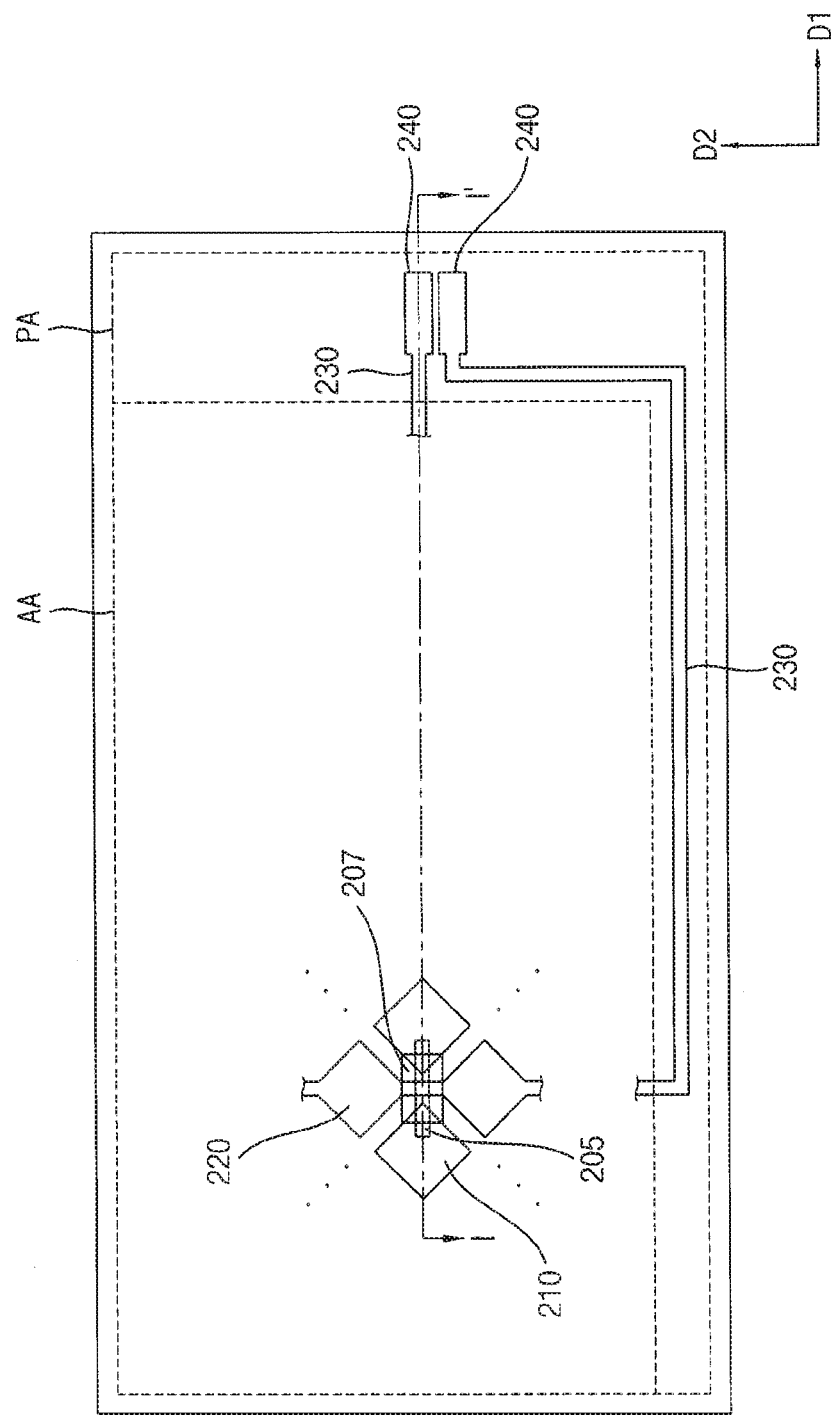

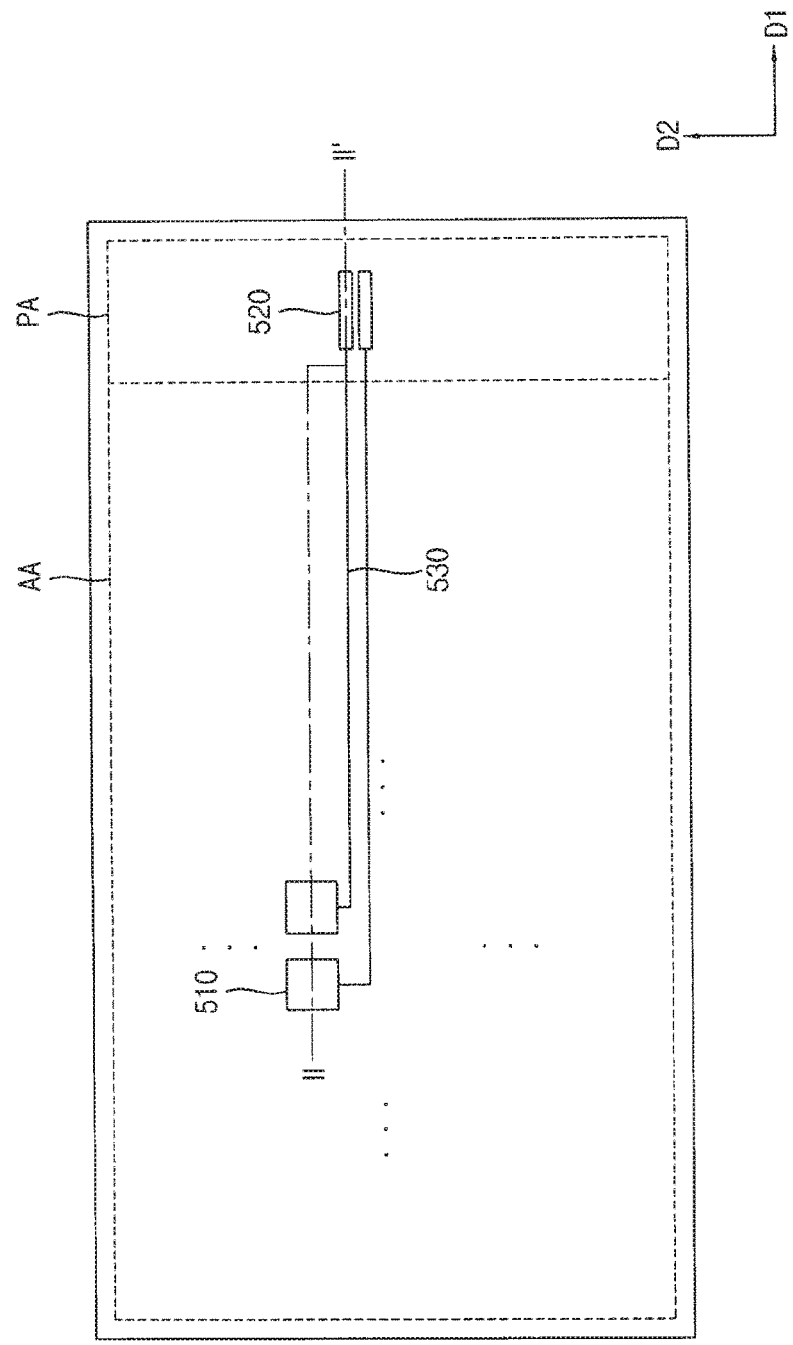

LIQUID CRYSTAL DISPLAY PANEL AND METHOD OF MANUFACTURING THE SAME

CROSS-REFERENCE TO RELATED APPLICATION

This application claims priority from and the benefit of Korean Patent Application No. 10-2015-0177150, filed on Dec. 11, 2015, which is hereby incorporated by reference for all purposes as if fully set forth herein.

BACKGROUND

Field

Exemplary embodiments relate to a liquid crystal display panel and a method of manufacturing the same and, more particularly, to a liquid crystal display panel having touch electrodes, and a method of manufacturing the same.

Discussion of the Background

A liquid crystal display apparatus displays an image using changes in an optical property (for example, birefringence, rotatory polarization, dichroism and light scattering) of a pixel according to a change in the molecular arrangement of a liquid crystal layer. A liquid crystal display may include a pixel electrode, a common electrode, and a liquid crystal layer, and control voltages of the pixel electrode and the common electrode provide an electric field to liquid crystal molecules of the liquid crystal layer. The liquid crystal molecules of the liquid crystal display may be rearranged according to the electric field.

A liquid crystal display apparatus includes a touch panel, which is an input device for detecting a touch position by converting contact of a user or an object to an electrical signal. The touch panel can be integrated on the liquid crystal display apparatus by forming touch electrodes directly on a substrate of the liquid crystal display apparatus. In this case, durability of the touch electrode may be degraded due to manufacturing processes. For example, the touch electrode may be damaged during a rework of a polarizing plate used in the touch panel.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display apparatus including touch electrodes having improved durability and conductivity.

Exemplary embodiments also provide a method of manufacturing the liquid crystal display apparatus having improved yield.

Additional aspects will be set forth in the detailed description which follows, and, in part, will be apparent from the disclosure, or may be learned by practice of the inventive concept.

An exemplary embodiment discloses a liquid crystal display panel including a first substrate, a second substrate, and a liquid crystal layer disposed between the first substrate and the second substrate. The first substrate includes a first base substrate, a thin film transistor disposed on the first base substrate, a color filter disposed on the first base substrate; and a first alignment layer disposed on the thin film transistor and the color filter. The second substrate includes a second base substrate, a second alignment layer disposed on a first surface of the second base substrate, a touch electrode disposed on a second surface of the second base substrate in an active area, a connecting electrode disposed on the second surface in a peripheral area disposed adjacent to a boundary of the active area, and a connecting line disposed on the second surface and connecting the touch electrode to the connecting electrode. The first surface faces the first substrate, the second surface is opposite to the first surface, and the active area is configured to receive a touch input. The touch electrode includes a crystallized indium tin oxide.

An exemplary embodiment also discloses a method of manufacturing a liquid crystal display panel including providing a first substrate including a first base substrate, a thin film transistor disposed on the first base substrate, a color filter disposed on the first base substrate, and a first alignment layer disposed on the thin film transistor and the color filter, providing a second substrate formed independently from the first substrate, and forming a liquid crystal layer between the first substrate and the first surface of the second substrate. The second substrate includes a second base substrate having a first surface and a second surface opposite to the first surface. The providing of the second substrate includes forming a transparent conductive layer on the second surface by a high temperature process greater than 150° C., forming a touch electrode by patterning the transparent conductive layer, and forming a second alignment layer on the first surface.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 1A is a plan view illustrating a liquid crystal display panel according to an exemplary embodiment.

FIG. 3A is a plan view illustrating a liquid crystal display panel according to an exemplary embodiment.

DETAILED DESCRIPTION OF THE ILLUSTRATED EMBODIMENTS

Figure 1B:
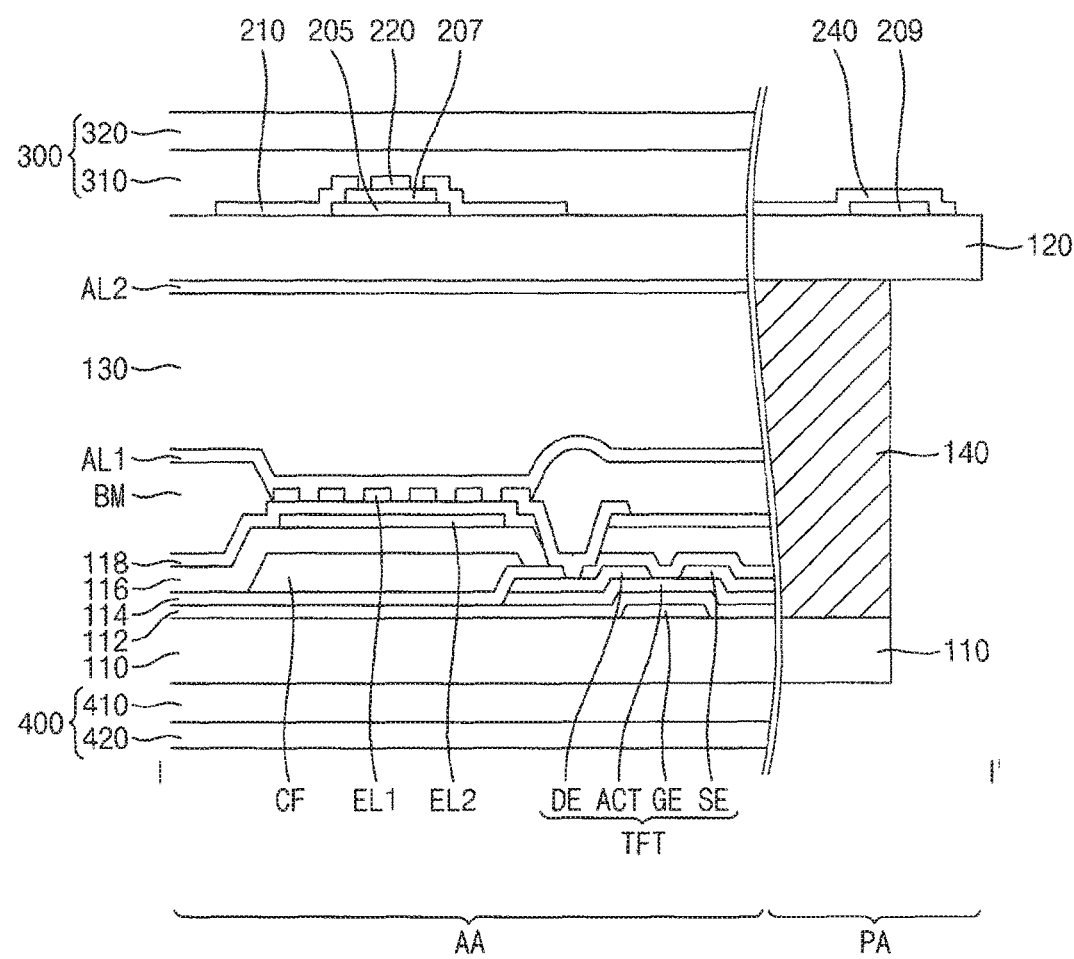
FIG. 1B is a cross-sectional view taken along a line I-I' of FIG. 1A.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1A is a plan view illustrating a liquid crystal display panel according to an exemplary embodiment. FIG. 1B is a cross-sectional view taken along a line I-I' of FIG. 1A.

Referring to FIGS. 1A and 1B, the liquid crystal display panel includes a first substrate, a second substrate, a liquid crystal layer 130 disposed between the first and second substrates, an upper polarizing plate 300, and a lower polarizing plate 400.

The first substrate may include a first base substrate 110, a gate electrode GE, a first insulation layer 112, an active pattern ACT, a source electrode SE, a drain electrode DE, a second insulation layer 114, a color filter CF, a third insulation layer 116, a second electrode EL2, a fourth insulation layer 118, a first electrode EL1, a black matrix BM, and a first alignment layer AL1.

The first base substrate 110 may include a transparent insulation substrate. For example, the first base substrate 110 may include a glass substrate, a quartz substrate, a transparent resin substrate, etc. The gate electrode GE may be disposed on the first base substrate 110. The first insulation layer 112 may be disposed on the first base substrate 110 on which the gate electrode GE is disposed. The active pattern ACT may be disposed on the first insulation layer 112. The source electrode SE and the drain electrode DE may be disposed on the active pattern ACT. The second insulation layer 114 may be disposed on the first insulation layer 112 on which the active pattern ACT, the source electrode SE, and the drain electrode DE are disposed.

The gate electrode GE, the active pattern ACT, the source electrode SE and the drain electrode DE may configure a thin film transistor TFT and may be provided to each of pixels.

The color filter CF is disposed on the second insulation layer 114. The color filter CF may supply a color to light passing through the liquid crystal layer 130. The color filter CF may include a red color filter, a green color filter and a blue color filter. The color filter CF may have a different color from an adjacent pixel.

The third insulation layer 116 may be disposed on the second insulation layer 114 on which the color filter CF is disposed. The second electrode EL2 may be disposed on the third insulation layer 116. The fourth insulation layer 118 may be disposed on the third insulation layer 116 on which the second electrode EL2 is disposed. The first electrode EL1 may be disposed on the fourth insulation layer 118.

The second electrode EL2 may be a common electrode, and may receive a common voltage. The first electrode EL1 may be a pixel electrode which is electrically connected to the drain electrode DE of the thin film transistor TFT through a contact hole which is formed through the fourth insulation layer 118, a third insulation layer 116, and the second insulation layer 114. A plurality of slits may be formed on the first electrode ELL The black matrix BM may be disposed on the fourth insulation layer 118 on which the first electrode EL1 is disposed. The black matrix BM may include a light blocking material, and overlap the thin film transistor TFT.

The first alignment layer AL1 may be disposed on the first electrode EL1 and the black matrix BM. The first alignment layer AL1 may include alignment agent to align liquid crystal molecules of the liquid crystal layer 130. For example, the alignment agent may include a polyimide-based compound, a polyamic acid-based compound, or a mixture thereof. In addition, the alignment agent may include photo-alignment agent which align the liquid crystal molecules by linearly polarized light ultraviolet.

The second substrate may include a second base substrate 120, a bridge electrode 205, an insulation pattern 207, a router metal 209, a first touch electrode 210, a second touch electrode 220, a connecting line 230, a connecting electrode 240, and a second alignment layer AL2.

The second base substrate 120 may include a transparent insulation substrate. For example, the second base substrate 120 may include a glass substrate, a quartz substrate, a transparent resin substrate, etc. Examples of the transparent resin substrate for the second base substrate 120 may include polyimide-based resin, acryl-based resin, polyacrylate-based resin, polycarbonate-based resin, polyether-based resin, sulfonic acid containing resin, polyethyleneterephthalate-based resin, etc.

The bridge electrode 205 may be disposed in an active area AA on the second base substrate 120. The active area AA is an area capable of receiving touch input. The bridge electrode 205 may include a transparent conductive material. The bridge electrode 205 may include indium tin oxide (ITO). According to exemplary embodiments, the bridge electrode 205 may be formed by a high temperature process which is greater than 150° C. The indium tin oxide included in the bridge electrode 205 may be crystallized according to the high temperature process.

The insulation pattern 207 may be disposed on the bridge electrode 205, and may expose both ends of the bridge electrode 205 in a first direction D1. The insulation pattern 207 may include an organic insulation material or an inorganic insulation material.

The first touch electrode 210 may be disposed in the active area AA on the second base substrate 120. A plurality of first touch electrodes 210 may be arranged in the first direction D1 and a second direction D2. The second direction D2 may cross the first direction D1. For example, the second direction D2 may be substantially perpendicular to the first direction D1. The first touch electrodes 210 neighboring each other may be electrically connected through the bridge electrode 205. In an exemplary embodiment, first touch electrodes 210 arranged in the first direction D1 are electrically connected through corresponding bridge electrodes. The first touch electrode 210 may include a transparent conductive material. For example, the first touch electrode 210 may include indium tin oxide. Here, the first touch electrode 210 may be formed via the high temperature process, which is greater than 150° C. Accordingly, the first touch electrode 210 may include crystallized indium tin oxide via the high temperature process.

The second touch electrode 220 may be disposed on the second base substrate 120 in the active area AA. A plurality of second touch electrodes 220 may be arranged in the first direction D1 and the second direction D2. The second touch electrodes 220 arranged in the second direction D2 may be electrically connected to each other, and the second touch electrodes 220 arranged in the first direction D1 may be electrically unconnected with each other. In an exemplary embodiment, a transparent conductive material configuring the second touch electrodes 220 arranged in the second direction D2 extends in the second direction D2. Transparent conductive materials configuring the second touch electrodes 220 arranged in the first direction D1 may be spaced apart each other. The second touch electrode 220 may be spaced apart from the first touch electrode 210 by the insulation pattern 207. For example, a portion of the second touch electrode 220 overlapping the bridge electrode 205 is disposed on the insulation pattern 207 and spaced apart from the bridge electrode 205. The second touch electrode 220 and the first touch electrode 210 may include same material, and may be formed from a same layer. For example, the second touch electrode 220 may include crystallized indium tin oxide.

The router metal 209 may be disposed on the second base substrate 120 in a peripheral area PA which is adjacent to a boundary of the active area AA. Each router metal 209 may correspond to each connecting electrode 240. The router metal 209 may include a metal.

Each connecting electrode 240 may be electrically connected to the first or second touch electrodes 210, 220 through the connecting line 230. For example, a first connecting electrode is connected to the first touch electrode 210 through a first connecting line, and a second connecting electrode is connected to the second touch electrode 220 through a second connecting line. The connecting electrode 240 may cover the router metal 209. The connecting electrode 240 and the router metal 209 may be electrically connected to a touch driving circuit which is not illustrated. For example, the router metal 209 and the connecting electrode 240 may be electrically connected to a flexible printed circuit board including a driver IC configured to detect touch position.

The connecting line 230 may be disposed on the second base substrate 120. Each connecting line 230 may electrically connect the first or second touch electrode 210 or 220 to the connecting electrode 240. For instance, a first connecting line electrically connects the first touch electrode 210 to a first connecting electrode, and a second connecting line electrically connects the second touch electrode 220 to a second connecting electrode.

The first touch electrode 210, the second touch electrode 220, the connecting line 230, and the connecting electrode 240 may be formed from a same layer.

According to an exemplary embodiment, the first touch electrode 210, the second touch electrode 220, the connecting line 230, and the connecting electrode 240 may include same material, such as crystallized indium tin oxide. The first and second touch electrodes 210 and 220, the connecting line 230, and the connecting electrode 240 may be formed via the high temperature process, so that indium tin oxide included in them may be crystallized. Thus, a surface resistance may be less than amorphous indium tin oxide formed via a low temperature process. In this case, the first and second touch electrodes 210 and 220, the connecting line 230, and the connecting electrode 240 may be formed to have relatively small thicknesses. For example, each of the first and second touch electrodes 210 and 220 and the connecting line 230 has a thickness less than about 3000 Å. For example, each of the first and second touch electrodes 210 and 220 and the connecting line 230 is in a range of about 500 Å to 3000 Å thick.

According to an exemplary embodiment, at least one of the first touch electrode 210, the second touch electrode 220, and the connecting line 230 has a mesh structure formed by a fine line having a width less than about 5 um (micrometers). The fine line may include a material selected from the group consisting of aluminum, copper, silver, molybdenum, platinum, palladium, neodymium, and alloy thereof. In this case, the first touch electrode 210, the second touch electrode 220, and the connecting line 230 may be in a range of about 2000 Å to 10000 Å thick.

The second alignment layer AL2 may be disposed on a surface of the second base substrate 120 which faces the first substrate and is an opposite surface of first and second touch electrodes 210 and 220, the connecting line 230 and the connecting electrode 240. The second alignment layer AL2 may include alignment agent to align liquid crystal molecules of the liquid crystal layer 130. For example, the alignment agent may include a polyimide-based compound, a polyamic acid-based compound, or a mixture thereof. In addition, the alignment agent may include photo-alignment agent which align the liquid crystal molecules by linearly polarized light ultraviolet.

The liquid crystal layer 130 may be disposed between the first alignment layer AL1 of the first substrate and the second alignment layer AL2 of the second substrate. The liquid crystal layer 130 may include liquid crystal molecules having optical anisotropy. The liquid crystal molecules may be driven by electric field, so that an image may be displayed by passing or blocking light through the liquid crystal layer 130.

The liquid crystal layer 130 may be sealed by sealing element 140 formed between the first base substrate 110 and the second base substrate 120 at a boundary of the liquid crystal display panel. The sealing element 140 may be disposed at the peripheral area PA.

The lower polarizing plate 400 may be disposed on an outer surface of the first base substrate 110 which is opposite to the surface of the first base substrate 110 facing the second substrate. The lower polarizing plate 400 may include a lower adhesive layer 410 and a lower polarizing layer 420. The lower adhesive layer 410 may include pressure sensitive adhesive (PSA) configured to attach the lower polarizing layer 420 onto the first substrate.

The upper polarizing plate 300 may be disposed on the first and second touch electrodes 210 and 220 of the second substrate. The upper polarizing plate 300 may include an upper adhesive layer 310 and an upper polarizing layer 320. The upper adhesive layer 310 may include pressure sensitive adhesive configured to attach the upper polarizing layer 320 onto the second substrate.

The liquid crystal display panel according to the exemplary embodiment may include the first and second touch electrodes 210 and 220 and the connecting line 230 which are formed through a high temperature process. Accordingly, the first and second touch electrodes 210 and 220 and the connecting line 230 may have relatively low surface resistance and have relatively high strength. Each of the first and second touch electrodes 210 and 220 and the connecting line 230 may be formed to have a relatively small thickness. Further, damage caused by repeatedly attaching the upper polarizing plate 300 may be reduced, despite each of the first and second touch electrodes and the connecting line having relatively small thicknesses.

Figure 2A:
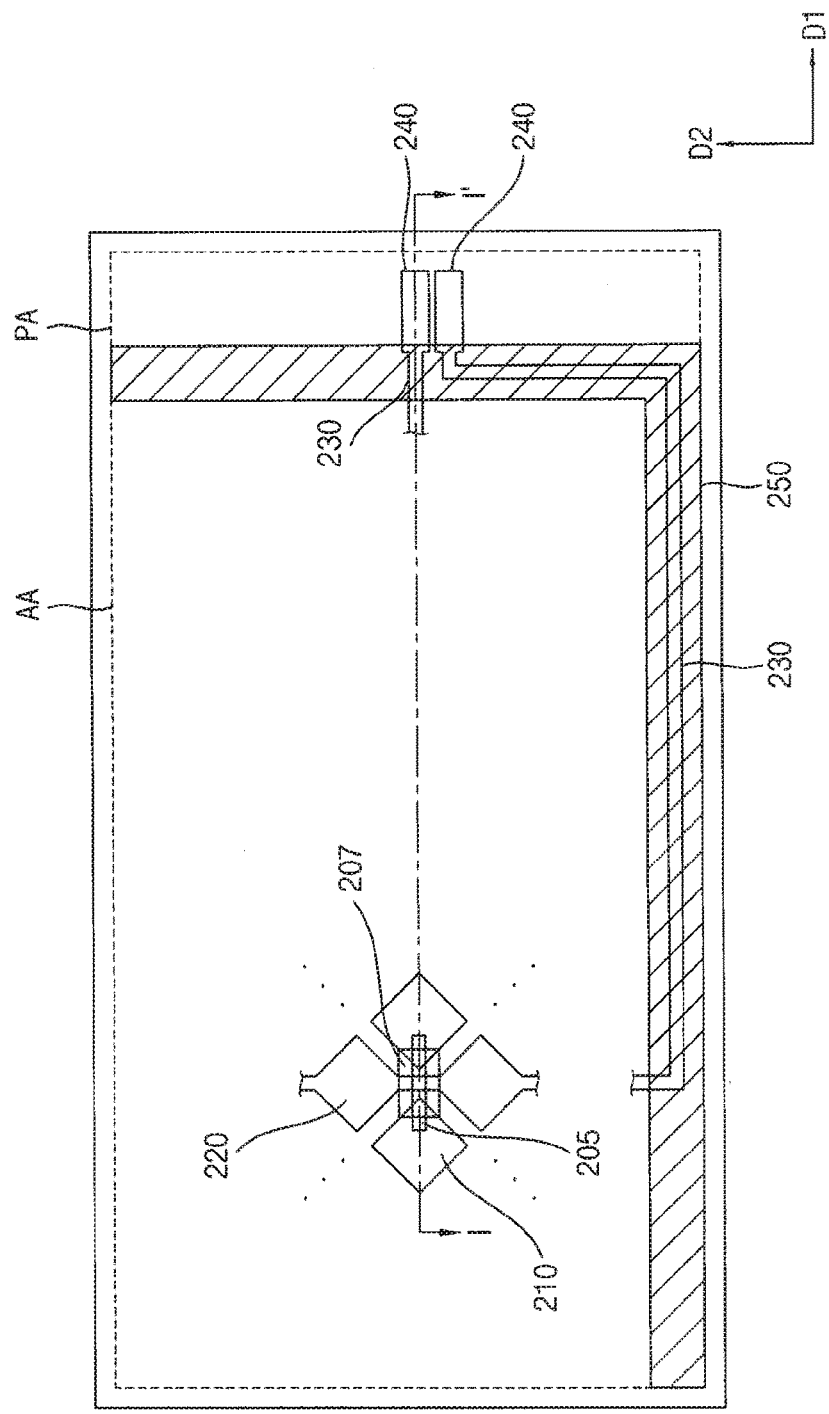
FIG. 2A is a plan view illustrating a liquid crystal display panel according to an exemplary embodiment.
Figure 2B:
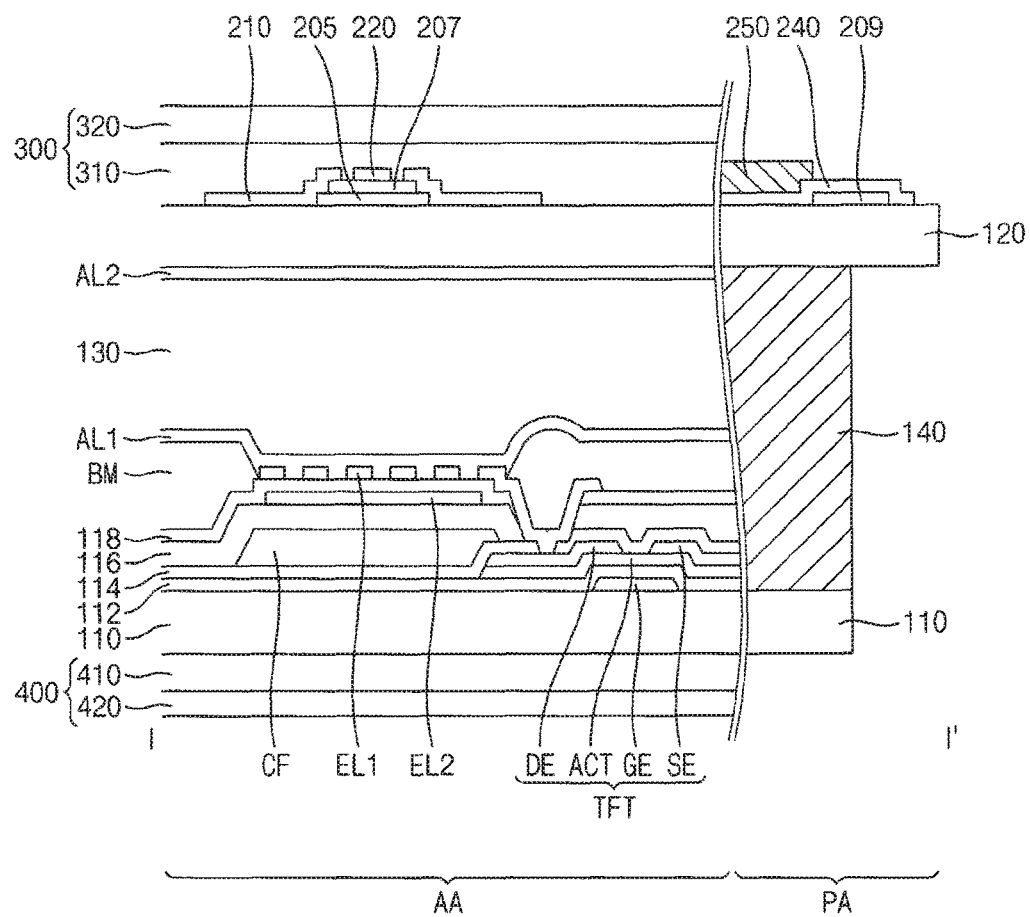
FIG. 2B is a cross-sectional view taken along a line I-I' of FIG. 1A.

FIG. 2A is a plan view illustrating a liquid crystal display panel according to an exemplary embodiment. FIG. 2B is a cross-sectional view taken along a line I-I' of FIG. 1A.

Referring to FIGS. 2A and 2B, the liquid crystal display panel may be substantially the same as the liquid crystal display panel of FIGS. 1A and 1B, except for an inorganic insulation pattern 250. Thus, any further detailed descriptions concerning the same elements will be briefly described or omitted.

The liquid crystal display panel includes a first substrate, a second substrate, a liquid crystal layer 130 disposed between the first and second substrates, an upper polarizing plate 300, and a lower polarizing plate 400. The upper polarizing plate 300 includes an upper adhesive layer 310 and an upper polarizing layer 320. The lower polarizing plate 400 includes a lower adhesive layer 410, and a lower polarizing layer 420

The first substrate may include a first base substrate 110, a gate electrode GE, a first insulation layer 112, an active pattern ACT, a source electrode SE, a drain electrode DE, a second insulation layer 114, a color filter CF, a third insulation layer 116, a second electrode EL2, a fourth insulation layer 118, a first electrode EL1, a black matrix BM, and a first alignment layer AL1. The gate electrode GE, the active pattern ACT, the source electrode SE, and the drain electrode DE may configure a thin film transistor TFT.

The second substrate may include a second base substrate 120, a bridge electrode 205, an insulation pattern 207, a router metal 209, a first touch electrode 210, a second touch electrode 220, a connecting electrode 240, a connecting line 230, an inorganic insulation pattern 250, and a second alignment layer AL2.

The inorganic insulation pattern 250 may cover the connecting line 230 in a peripheral area PA, which is adjacent to an active area AA. That is, the inorganic insulation pattern 250 covers the connecting line 230 instead of the upper polarizing plate 300 in the peripheral area PA, so that the connecting line 230 may be protected.

The inorganic insulation pattern 250 may include an inorganic insulation material. For example, the inorganic insulation pattern 250 includes silicon oxide ($SiO_x$) or silicon nitride $SiN_x$. The inorganic insulation pattern 250 may be formed via a high temperature process that is greater than 150° C. The inorganic insulation pattern 250 may have a relatively high strength. Thus, although a portion of the upper adhesive layer 310 is attached on and detached from the inorganic insulation pattern 250, damage caused by repeatedly attaching the upper polarizing plate 300 may be reduced. Accordingly, the product yield may be improved.

Figure 3B:
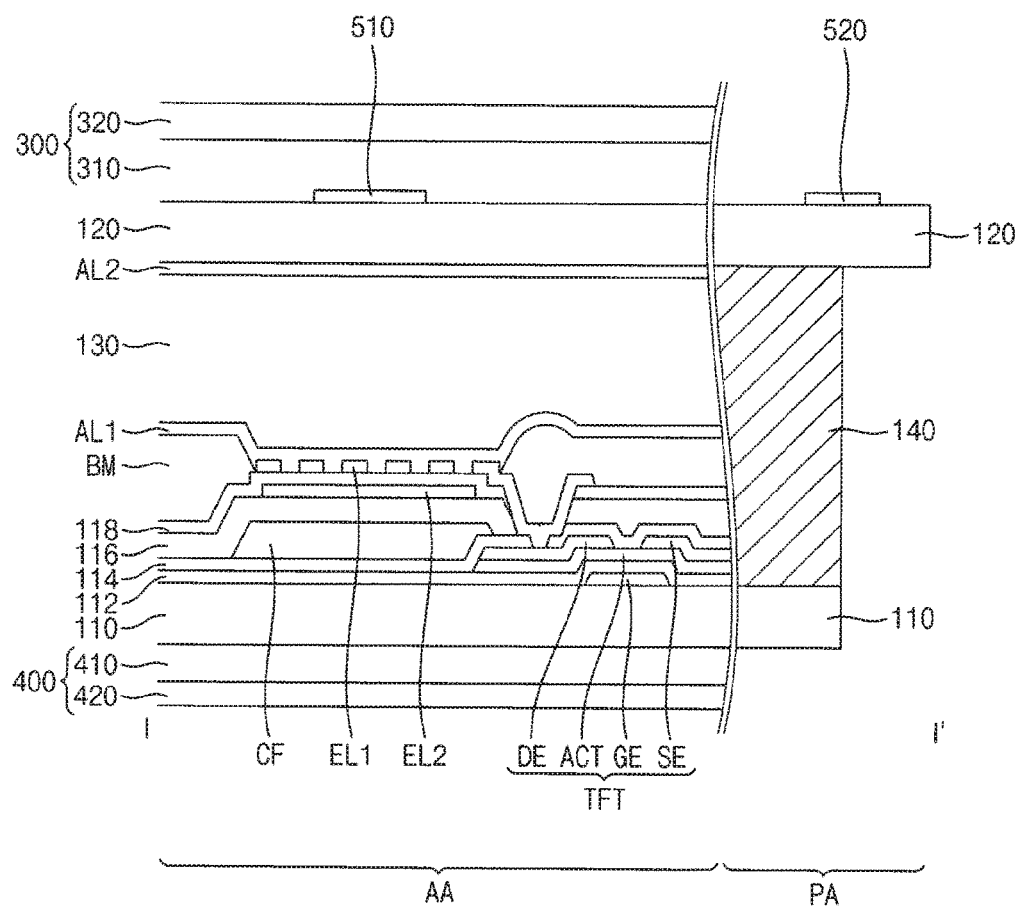
FIG. 3B is a cross-sectional view taken along a line II-II' of FIG. 1A.

FIG. 3A is a plan view illustrating a liquid crystal display panel according to an exemplary embodiment. FIG. 3B is a cross-sectional view taken along a line II-II' of FIG. 1A.

Referring to FIGS. 3A and 3B, the liquid crystal display panel is substantially the same as the liquid crystal display panel of FIGS. 1A and 1B, except for a touch electrode 510, a connecting electrode 520 and a connecting line 530. Thus, any further detailed descriptions concerning the same elements will be briefly described or omitted.

The liquid crystal display panel includes a first substrate, a second substrate, a liquid crystal layer 130 disposed between the first and second substrates, an upper polarizing plate 300 and a lower polarizing plate 400. The upper polarizing plate 300 includes an upper adhesive layer 310 and an upper polarizing layer 320. The lower polarizing plate 400 includes a lower adhesive layer 410 and a lower polarizing layer 420.

The first substrate may include a first base substrate 110, a gate electrode GE, a first insulation layer 112, an active pattern ACT, a source electrode SE, a drain electrode DE, a second insulation layer 114, a color filter CF, a third insulation layer 116, a second electrode EL2, a fourth insulation layer 118, a first electrode EL1, a black matrix BM, and a first alignment layer AL1. The gate electrode GE, the active pattern ACT, the source electrode SE, and the drain electrode DE may configure a thin film transistor TFT.

The second substrate may include a second base substrate 120, a touch electrode 510, a connecting electrode 520, a connecting line 530, and a second alignment layer AL2.

The touch electrode 510 may be disposed in an active area AA on the second base substrate 120. The active area AA is an area capable of touch input. The touch electrodes may be arranged in a first direction D1 and a second direction D2. The second direction D2 may cross the first direction D1. For example, the second direction D2 may be substantially perpendicular to the first direction D1.

The connecting electrode 520 may be disposed on the second base substrate 120 in a peripheral area PA, which is adjacent to a boundary of the active area AA. The connecting electrode 520 may be electrically connected to the touch electrode 510 though the connecting line 530. For example, each connecting electrode 520 is electrically connected to touch electrodes 510 arranged in the second direction D2. For example, each connecting electrode 520 is electrically connected to each touch electrode 510.

The connecting line 530 may be disposed on the second base substrate 120. Each connecting line 530 may electrically connect the touch electrode 510 to the connecting electrode 520.

According to an exemplary embodiment, the connecting line 530, the touch electrode 510, and the connecting electrode 520 may include crystallized indium tin oxide that is formed via a high temperature process that is greater than 150° C., so that a surface resistance may be less than amorphous indium tin oxide formed via a low temperature process. Thus, the touch electrode 510 and the connecting electrode 530 may be formed to have relatively small thicknesses. For example, each of the touch electrode 510 and the connecting electrode 530 may have a thickness less than about 3000 Å.

Figure 4A:
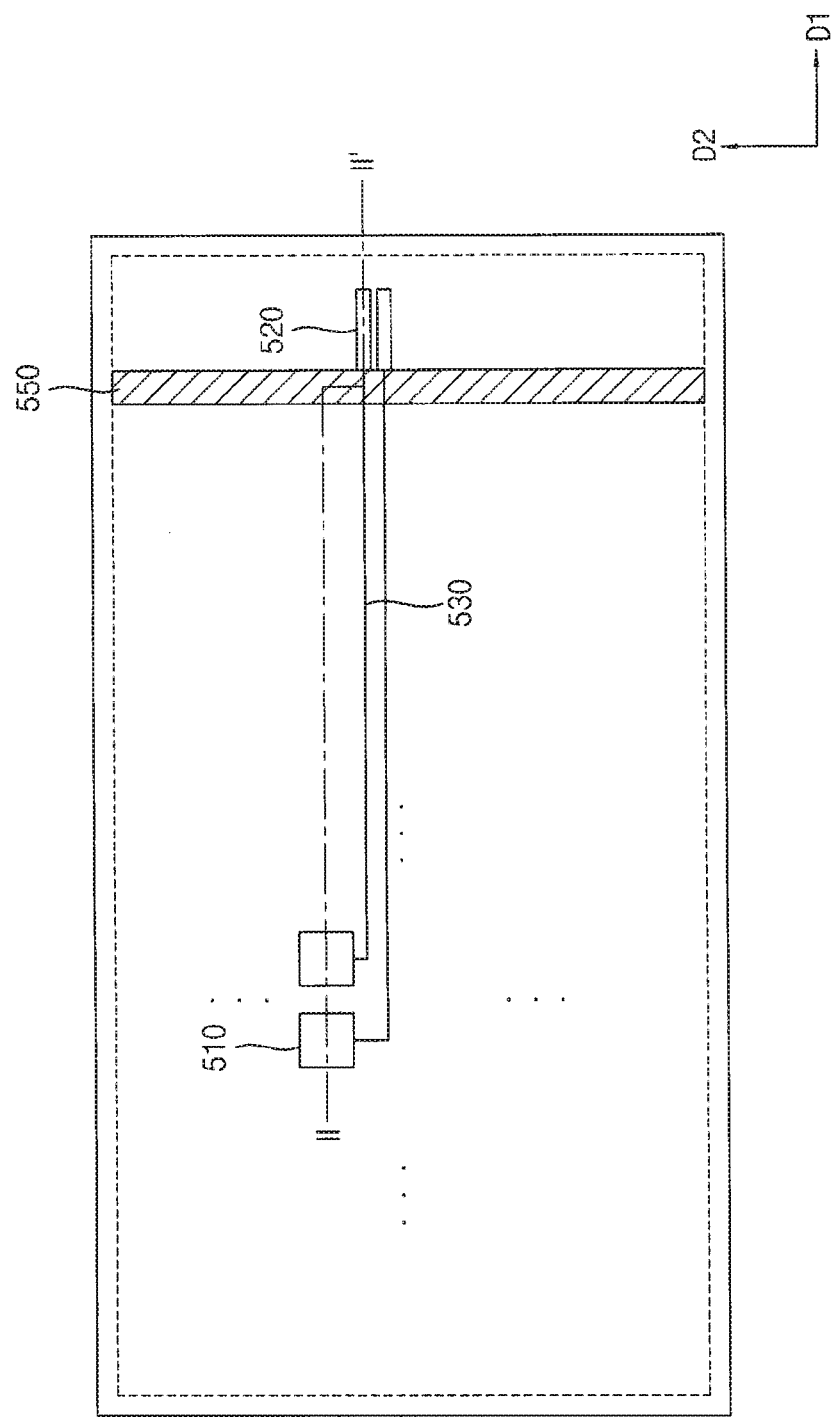
FIG. 4A is a plan view illustrating a liquid crystal display panel according to an exemplary embodiment.
Figure 4B:
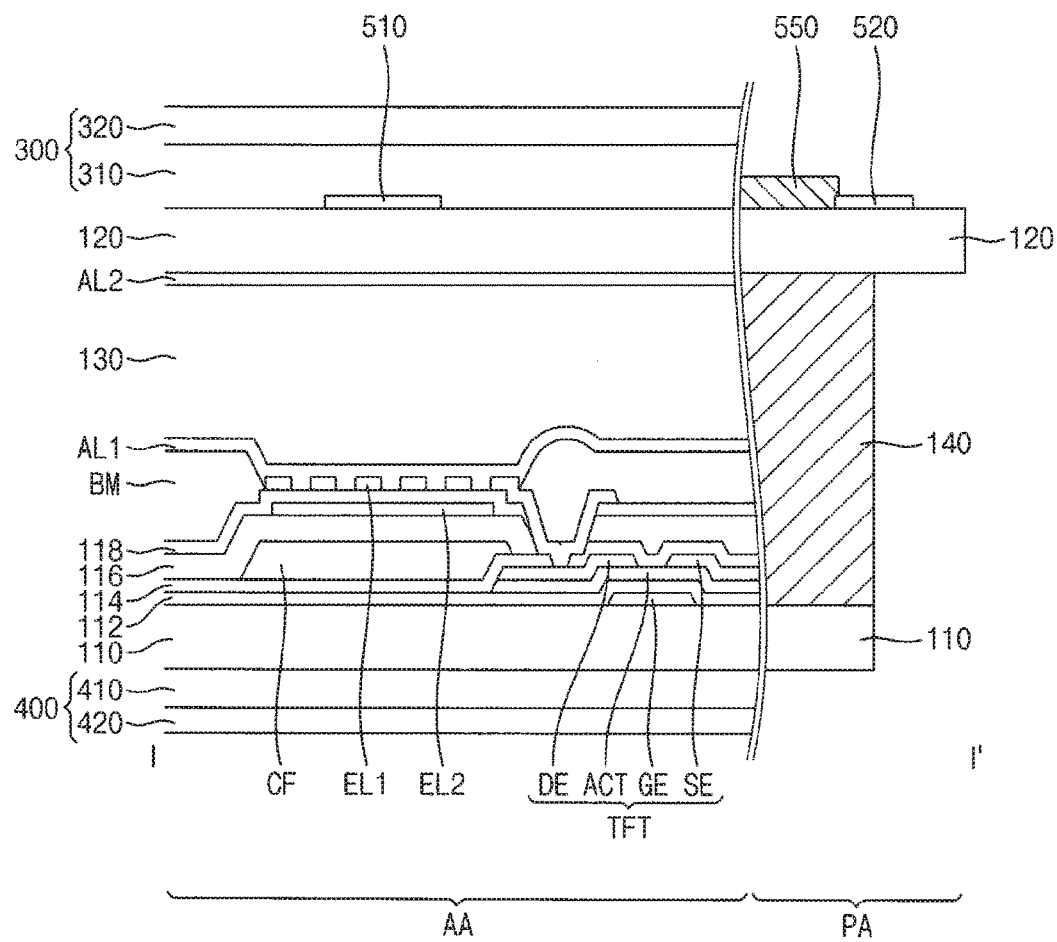
FIG. 4B is a cross-sectional view taken along a line II-II' of FIG. 1A.

FIG. 4A is a plan view illustrating a liquid crystal display panel according to an exemplary embodiment. FIG. 4B is a cross-sectional view taken along a line II-II' of FIG. 1A.

Referring to FIGS. 4A and 4B, the liquid crystal display panel is substantially the same as the liquid crystal display panel of FIGS. 3A and 3B, except for an inorganic insulation pattern 550. Thus, any further detailed descriptions concerning the same elements will be briefly described or omitted.

The liquid crystal display panel includes a first substrate, a second substrate, a liquid crystal layer 130 between the first and second substrates, an upper polarizing plate 300, and a lower polarizing plate 400. The upper polarizing plate 300 includes an upper adhesive layer 310 and an upper polarizing layer 320. The lower polarizing plate 400 includes a lower adhesive layer 410 and a lower polarizing layer 420.

The first substrate may include a first base substrate 110, a gate electrode GE, a first insulation layer 112, an active pattern ACT, a source electrode SE, a drain electrode DE, a second insulation layer 114, a color filter CF, a third insulation layer 116, a second electrode EL2, a fourth insulation layer 118, a first electrode EL1, a black matrix BM, and a first alignment layer AL1. The gate electrode GE, the active pattern ACT, the source electrode SE, and the drain electrode DE may configure a thin film transistor TFT.

The second substrate may include a second base substrate 120, a touch electrode 510, a connecting electrode 520, a connecting line 530, and a second alignment layer AL2.

The inorganic insulation pattern 550 may cover the connecting line 530 in a peripheral area PA which is adjacent to an active area AA to protect the connecting line 530. The inorganic insulation pattern 550 may include an inorganic insulation material. For example, the inorganic insulation pattern 550 may include silicon oxide ($SiO_x$) or silicon nitride $SiN_x$. The inorganic insulation pattern 550 may be formed via a high temperature process which is greater than 150° C., so that the inorganic insulation pattern 550 may have a relatively high strength.

Figure 5:
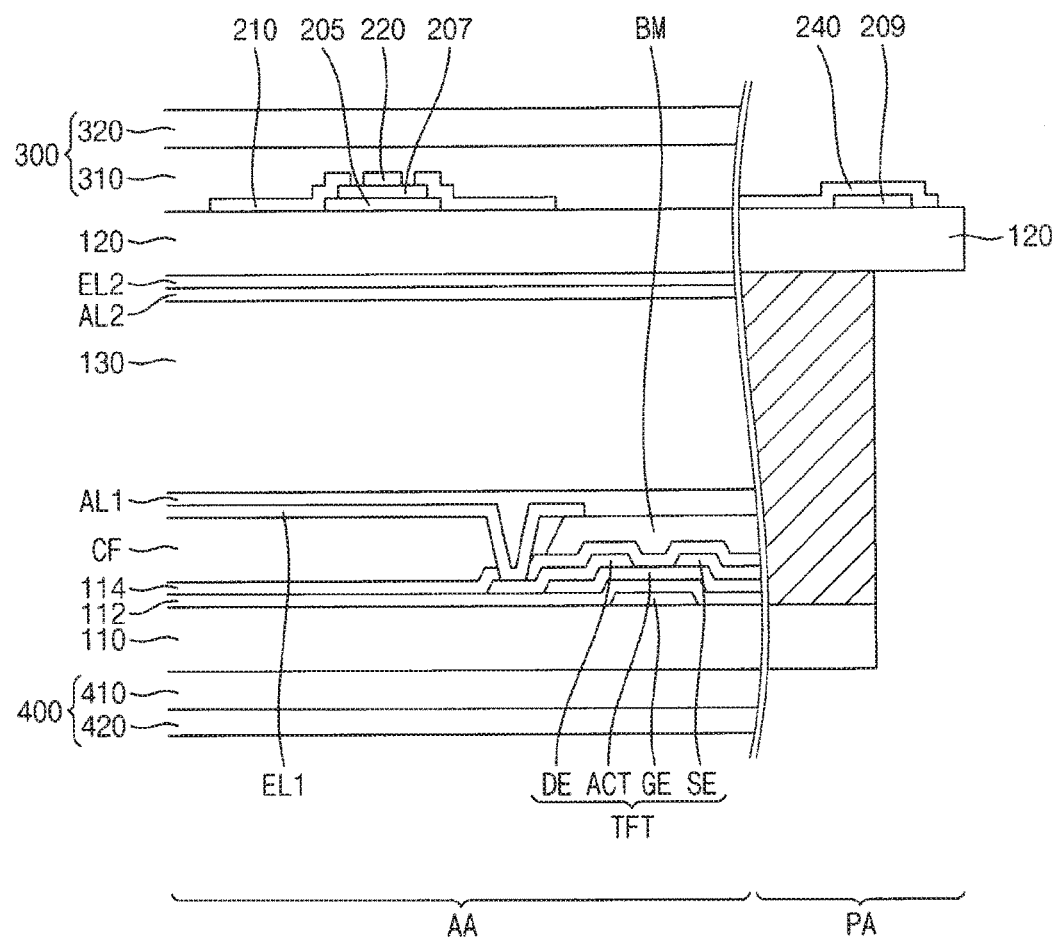
FIG. 5 is a cross-sectional view illustrating a liquid crystal display panel according to an exemplary embodiment.

FIG. 5 is a cross-sectional view illustrating a liquid crystal display panel according to an exemplary embodiment.

Referring to FIG. 5, the liquid crystal display panel may be substantially the same as the liquid crystal display panel of FIGS. 1A and 1B, except for elements of the liquid crystal display panel between a first base substrate 110 and a second base substrate 120. Thus, any further detailed descriptions concerning the same elements will be briefly described or omitted.

The liquid crystal display panel includes a first substrate, a second substrate, a liquid crystal layer 130 disposed between the first and second substrates, an upper polarizing plate 300, and a lower polarizing plate 400. The upper polarizing plate 300 includes an upper adhesive layer 310 and an upper polarizing layer 320. The lower polarizing plate 400 includes a lower adhesive layer 410 and a lower polarizing layer 420.

The first substrate may include a first base substrate 110, a gate electrode GE, a first insulation layer 112, an active pattern ACT, a source electrode SE, a drain electrode DE, second insulation layer 114, a color filter CF, a black matrix BM, a first electrode EL1, and a first alignment layer AL1. The gate electrode GE, the active pattern ACT, the source electrode SE and the drain electrode DE may configure a thin film transistor TFT.

The first base substrate 110 may include a transparent insulation substrate. For example, the first base substrate 110 may include a glass substrate, a quartz substrate, a transparent resin substrate, etc. The gate electrode GE may be disposed on the first base substrate 110. The first insulation layer 112 may be disposed on the first base substrate 110 on which the gate electrode GE is disposed. The active pattern ACT may be disposed on the first insulation layer 112. The source electrode SE and the drain electrode DE may be disposed on the first insulation layer 112 on which the active pattern ACT is disposed. The second insulation layer 114 may be disposed on the first insulation layer 112 on which the active pattern ACT, the source electrode SE, and the drain electrode DE are disposed. The gate electrode GE, the active pattern ACT, the source electrode SE, and the drain electrode DE may configure a thin film transistor TFT.

The color filter CF is disposed on the second insulation layer 114. The color filter CF may supply a color to light passing through the liquid crystal layer 130. The black matrix BM may be disposed on the second insulation layer 114 and overlap the thin film transistor TFT. The black matrix BM may include a light blocking material.

The first electrode EL1 may be disposed on the color filter CF and the black matrix BM. The first electrode EL1 may be a pixel electrode which is electrically connected to the drain electrode DE of the thin film transistor TFT through a contact hole, which is formed through the second insulation layer 114.

The first alignment layer AL1 may be disposed on the first electrode ELL

The second substrate may include a second base substrate 120, a bridge electrode 205, an insulation pattern 207, a router metal 209, a first touch electrode 210, a second touch electrode 220, a connecting electrode 240, a connecting line (see 230 in FIG. 1A), a second electrode EL2, and a second alignment layer AL2.

The second electrode EL2 may be disposed on a surface of the second base substrate 120 which faces the first substrate and is an opposite surface of first and second touch electrodes 210 and 220, the connecting line, and the connecting electrode 240. The second electrode EL2 may be a common electrode receiving a common voltage.

The second alignment layer AL2 may be disposed on the second electrode EL2.

Figure 6:
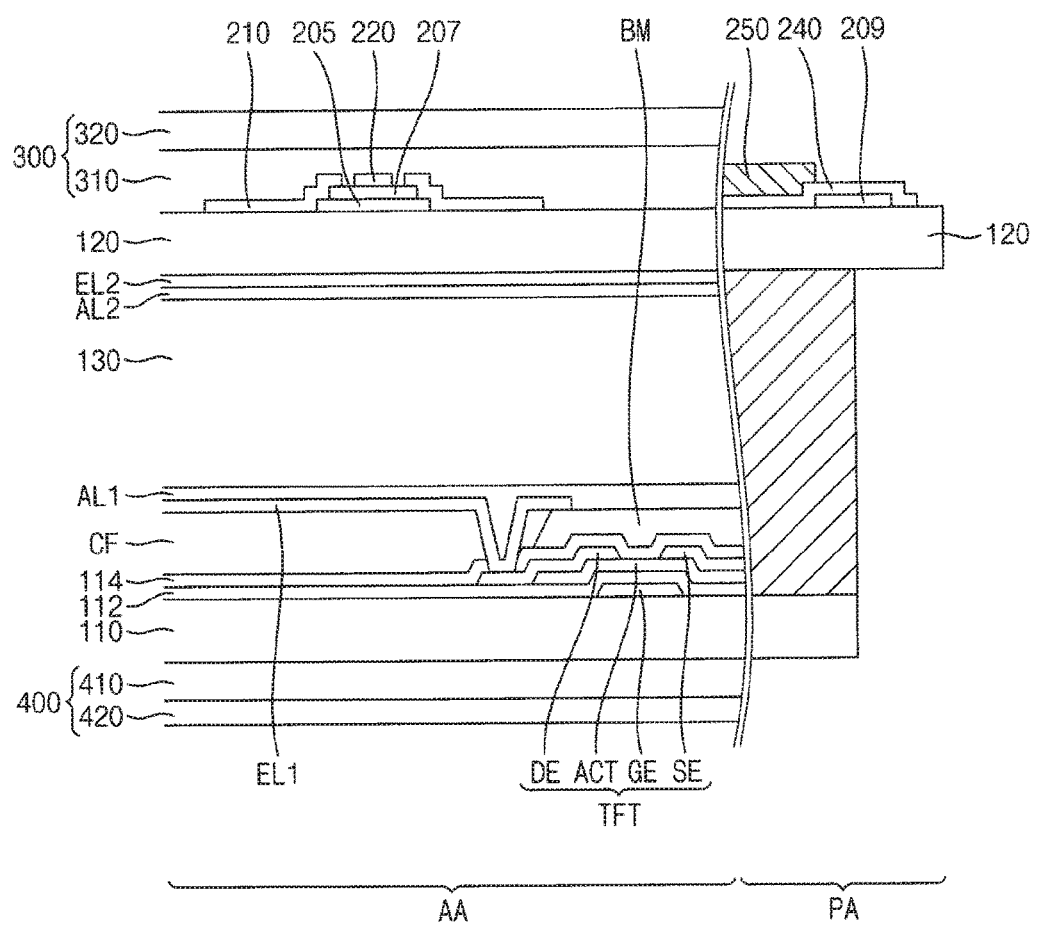
FIG. 6 is a cross-sectional view illustrating a liquid crystal display panel according to an exemplary embodiment.

FIG. 6 is a cross-sectional view illustrating a liquid crystal display panel according to an exemplary embodiment.

Referring to FIG. 6, the liquid crystal display panel may be substantially the same as the liquid crystal display panel of FIG. 5, except for an inorganic insulation pattern 250. Thus, any further detailed descriptions concerning the same elements will be briefly described or omitted.

The liquid crystal display panel includes a first substrate, a second substrate, a liquid crystal layer 130 disposed between the first and second substrates, an upper polarizing plate 300 and a lower polarizing plate 400. The upper polarizing plate 300 includes an upper adhesive layer 310 and an upper polarizing layer 320. The lower polarizing plate 400 includes a lower adhesive layer 410 and a lower polarizing layer 420.

The first substrate may include a first base substrate 110, a gate electrode GE, a first insulation layer 112, an active pattern ACT, a source electrode SE, a drain electrode DE, a second insulation layer 114, a color filter CF, a black matrix BM, a first electrode EL1, and a first alignment layer AL1. The gate electrode GE, the active pattern ACT, the source electrode SE and the drain electrode DE may configure a thin film transistor TFT.

The second substrate may include a second base substrate 120, a bridge electrode 205, an insulation pattern 207, a router metal 209, a first touch electrode 210, a second touch electrode 220, a connecting electrode 240, a connecting line (see 230 in FIG. 1A), an inorganic insulation pattern 250, a second electrode EL2, and a second alignment layer AL2.

The inorganic insulation pattern 250 may cover the connecting line 230 in a peripheral area PA which is adjacent to an active area AA to protect the connecting line 230.

The inorganic insulation pattern 250 may include an inorganic insulation material. For example, the inorganic insulation pattern 250 may include silicon oxide ($SiO_x$) or silicon nitride $SiN_x$. The inorganic insulation pattern 250 may be formed via a high temperature process which is greater than 150° C., so that the inorganic insulation pattern 250 may have a relatively high strength.

FIG. 7A, FIG. 7B, FIG. 7C, FIG. 7D, FIG. 7E, and FIG. 7F are cross-sectional views illustrating a method of manufacturing the display panel of FIG. 1A.

Figure 7A:
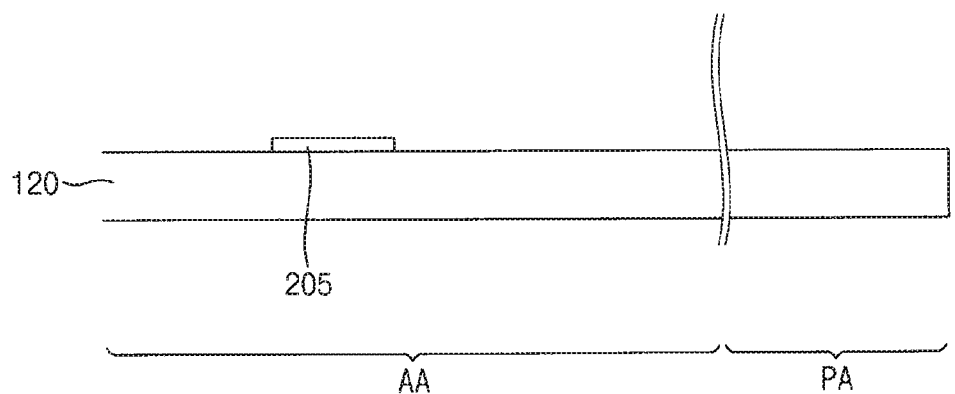
FIG. 7A, FIG. 7B, FIG. 7C, FIG. 7D, FIG. 7E, and FIG. 7F are cross-sectional views illustrating a method of manufacturing the liquid crystal display panel of FIG. 1A.

Referring to FIG. 7A, a bridge electrode 205 may be formed on a second base substrate 120 in an active area AA.

A transparent conductive layer may be formed on the second base substrate 120, and then be patterned to form the bridge electrode 205. The transparent conductive layer may include indium tin oxide (ITO).

The bridge electrode 205 may be formed via a high temperature process that is greater than 150° C. For example, the transparent conductive layer including indium tin oxide (ITO) may be formed on the second base substrate 120, and then an annealing process may be performed in high temperature which is greater than about 150° C. to crystallize the indium tin oxide. Accordingly, the bridge electrode 205 having crystallized indium tin oxide may have a lower surface resistance and a higher strength than indium tin oxide in the amorphous state, which is produced by a low temperature process.

Figure 7B:
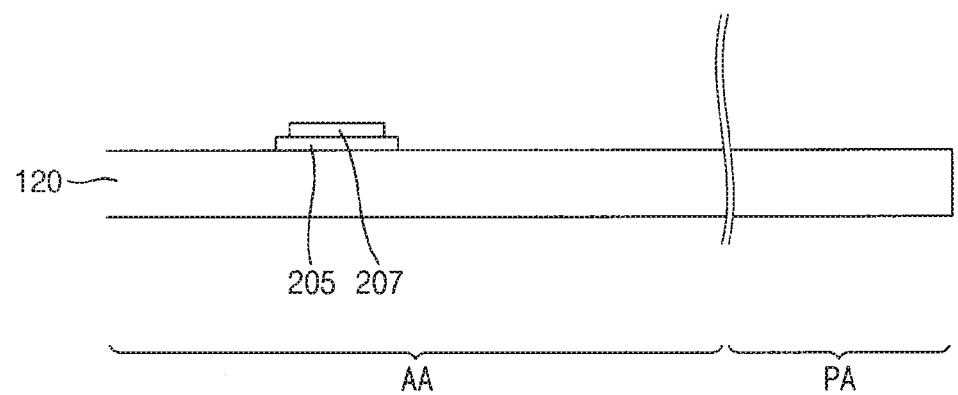

Referring to FIG. 7B, an insulation pattern 207 may be formed on the bridge electrode 205. The insulation patterns 207 may include organic insulation material or inorganic insulation material. The insulation patterns 207 may be formed via a high temperature process that is greater than 150° C.

Figure 7C:
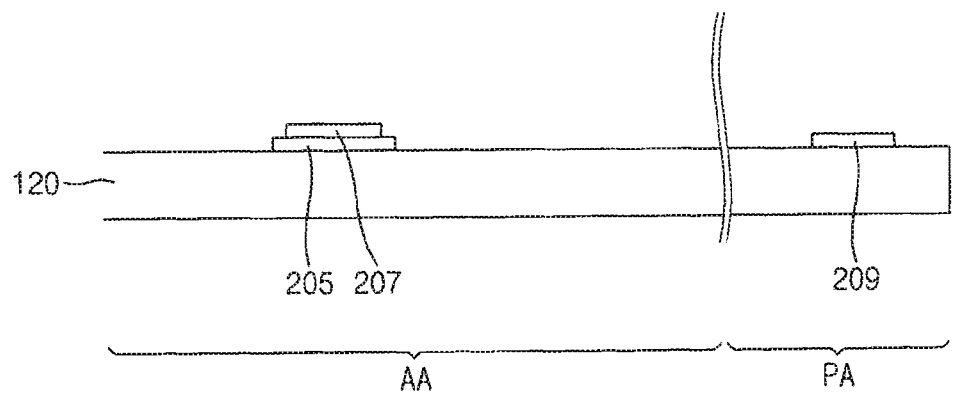

Referring to FIG. 7C, a router metal 209 may be formed on the second base substrate 120 in a peripheral area PA. The router metal 209 may include metal.

Figure 7D:
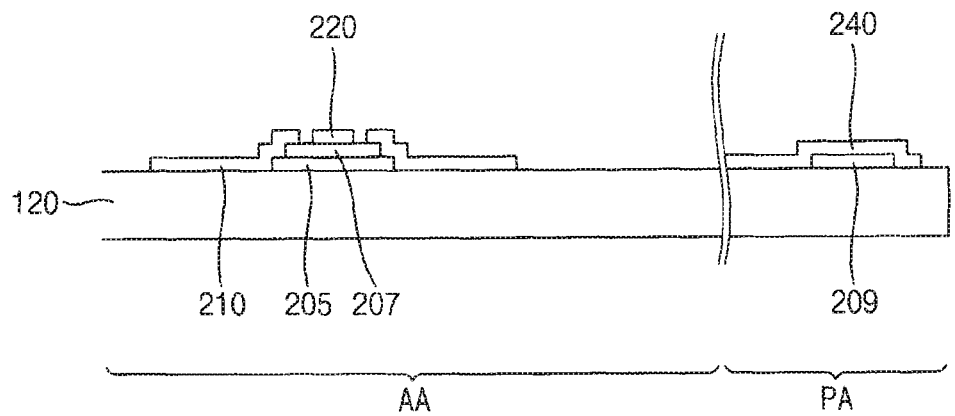

Referring to FIG. 7D, a first touch electrode 210, a second touch electrode 220, a connecting line (see 230 in 1A) and a connecting electrode 240 may be formed on the second base substrate 120 on which the bridge electrode 205, the insulation patterns 207, and the router metal 209 are formed. A transparent conductive layer may be formed on the second base substrate 120 on which the bridge electrode 205, the insulation patterns 207, and the router metal 209 are formed, and then the transparent conductive layer may be patterned to form the first touch electrode 210, the second touch electrode 220, the connecting line, and the connecting electrode 240. The transparent conductive layer may include indium tin oxide.

The transparent conductive layer may be treated by an annealing process, which may be performed at a high temperature greater than about 150° C. to crystallize the indium tin oxide contained therein. Thus, the first touch electrode 210, the second touch electrode 220, the connecting line, and the connecting electrode 240 may include the crystallized indium tin oxide. Accordingly, the first touch electrode 210, the second touch electrode 220, the connecting line, and the connecting electrode 240 may have lower surface resistance and higher strength than indium tin oxide in the amorphous state which is made by a low temperature process.

Figure 7E:
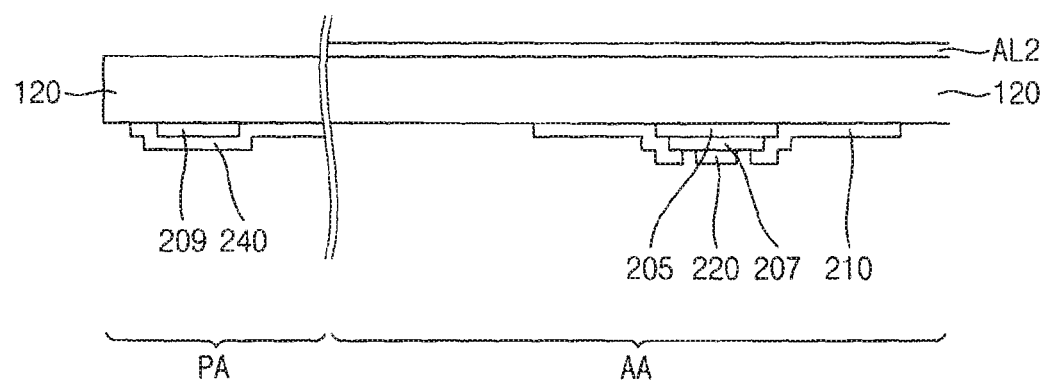

Referring to FIG. 7E, a second alignment layer AL2 may be formed on an opposite surface of the second base substrate 120 in the active area AA. The opposite surface opposes a surface of the second base substrate 120 on which the first touch electrode 210, the second touch electrode 220, the connecting line, and the connecting electrode 240 are formed. The second alignment layer AL2 may be formed by coating an alignment agent on the opposite surface of the second base substrate 120. For example, the alignment agent may include a polyimide-based compound, a polyamic acid-based compound, or a mixture thereof. In addition, the alignment agent may include a photo-alignment agent, which aligns the liquid crystal molecules using linearly polarized ultraviolet light.

The alignment agent may be coated on the second base substrate 120 when a substrate carrying device below the second substrate supports a bottom portion of the second substrate in a condition of which the opposite surface of the second base substrate 120 faces the substrate carrying device. In this case, the bottom portion of the second substrate, such as the first touch electrode 210, the second touch electrode 220, the connecting line, and the connecting electrode 240, may be stressed. According to an exemplary embodiment, the first touch electrode 210, the second touch electrode 220, the connecting line, and the connecting electrode 240 may have respectively high strength because of the high temperature process. Thus, damage caused by supporting of the substrate carrying device may be reduced. Accordingly, the product yield may be improved.

Figure 7F:
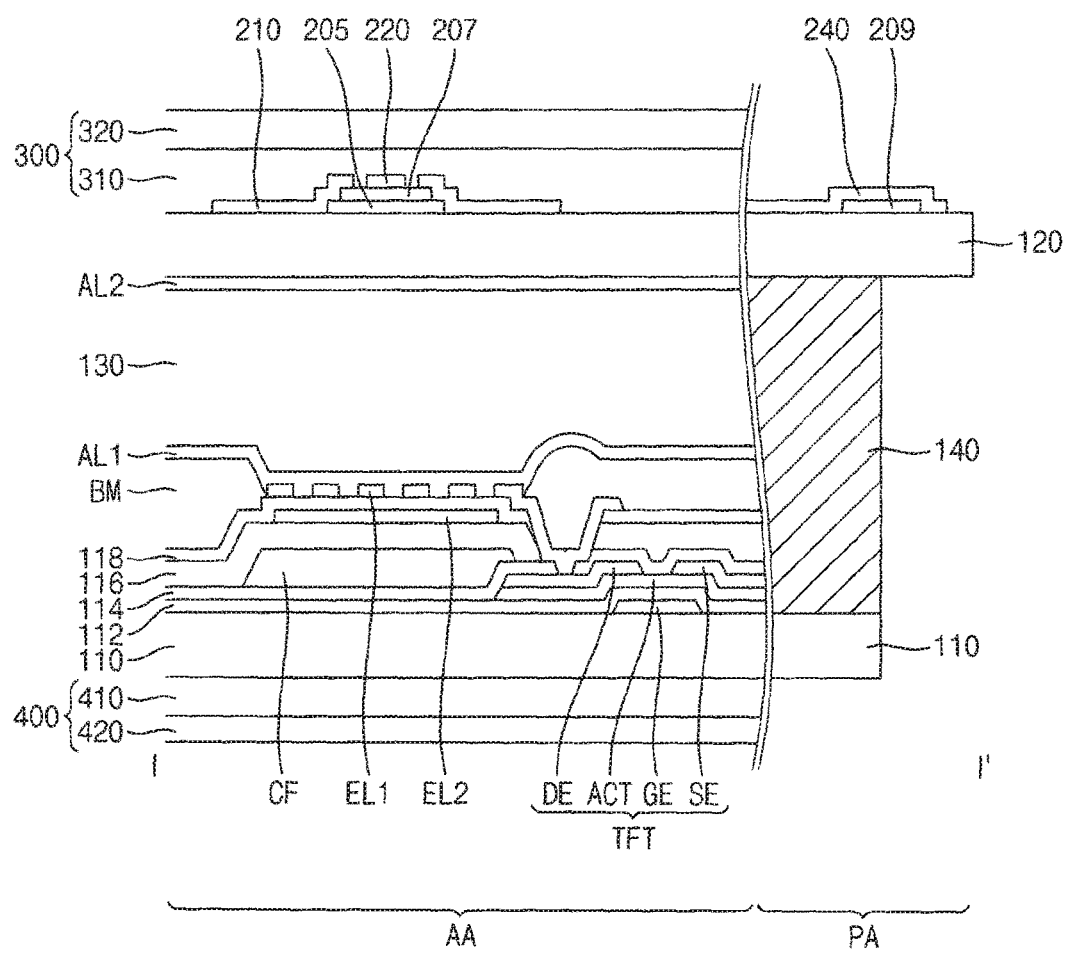

Referring to FIG. 7F, a first substrate may be disposed to face the second substrate. Then, a liquid crystal layer 130 may be formed between the first substrate and the second substrate. A sealing element 140 may then be formed to seal the liquid crystal layer 130.

The first substrate may include a first base substrate 110, a gate electrode GE, a first insulation layer 112, an active pattern ACT, a source electrode SE, a drain electrode DE, a second insulation layer 114, a color filter CF, a third insulation layer 116, a second electrode EL2, a fourth insulation layer 118, a first electrode EL1, a black matrix BM, and a first alignment layer AL1. The gate electrode GE, the active pattern ACT, the source electrode SE and the drain electrode DE may configure a thin film transistor TFT.

After sealing the liquid crystal layer 130, a lower polarizer 400 may be attached on an outer surface of the first base substrate 110 which is opposite to a surface of the first base substrate 110 facing the second substrate. The lower polarizing plate 400 may include a lower adhesive layer 410 and a lower polarizing layer 420.

An upper polarizing plate 300 may be attached on the second substrate on which the first and second touch electrodes 210 and 220 are disposed. The upper polarizing plate 300 may include an upper adhesive layer 310 and an upper polarizing layer 320.

Figure 8A:
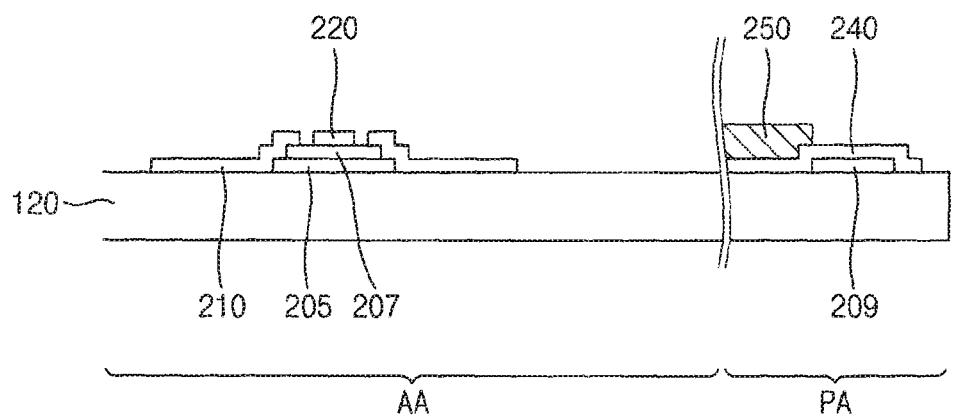
FIG. 8A and FIG. 8B are cross-sectional views illustrating a method of manufacturing the liquid crystal display panel of FIG. 2A.
Figure 8B:
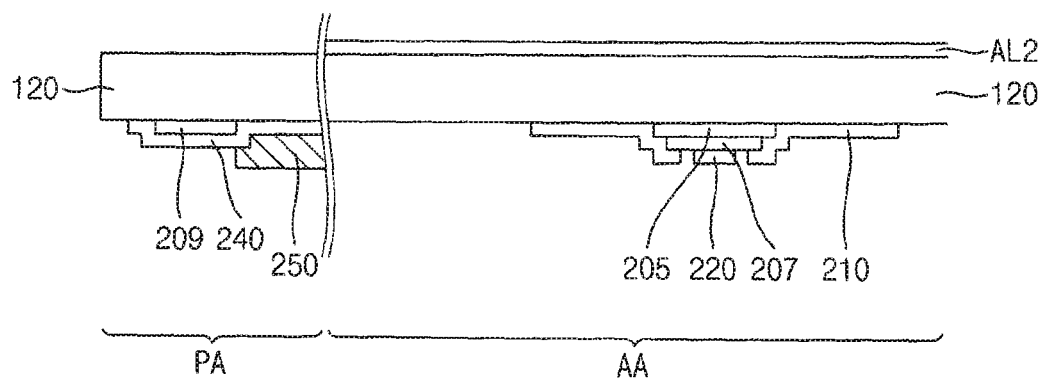

FIG. 8A and FIG. 8B are cross-sectional views illustrating a method of manufacturing the liquid crystal display panel of FIG. 2A.

Referring to FIG. 8A, a bridge electrode 205, an insulation pattern 207, a router metal 209, a first tough electrode 210, a second touch electrode 220, a connecting electrode 240 and a connecting line may be formed on a second base substrate 120 as described with reference to FIGS. 7A to 7D. Further, the inorganic insulation pattern 250 may be formed on the second base substrate 120 in a peripheral area PA which is adjacent to a boundary of an active area AA to cover the connecting line. Thus, the connecting line may be protected from damage.

The inorganic insulation pattern 250 may include an inorganic insulation material. For example, the inorganic insulation pattern 250 may include silicon oxide ($SiO_x$) or silicon nitride $SiN_x$. The inorganic insulation pattern 250 may be formed via a high temperature process which is greater than 150° C. For example, an inorganic insulation layer may be formed on the second base substrate 120 and be treated by an annealing process using a high temperature greater than about 150° C. Then, the treated inorganic insulation layer may be patterned to form the inorganic insulation pattern 250. According to the high temperature process, the inorganic insulation pattern 250 is stronger than an inorganic or organic insulation layer formed by a low temperature process. Thus, the inorganic insulation pattern 250 may effectively protect the connecting line from damage.

Referring to FIG. 8B, a second alignment layer AL2 may be formed on an opposite surface of the second base substrate 120 in the active area AA. The opposite surface opposes a surface of the second base substrate 120 on which the first touch electrode 210, the second touch electrode 220, the connecting line, and the connecting electrode 240 are formed. The second alignment layer AL2 may be formed by coating an alignment agent on the opposite surface of the second base substrate 120.

After placing a first substrate to face the second substrate, a liquid crystal layer may be formed between the first substrate and the second substrate. Then, a sealing element may be formed to seal the liquid crystal layer. The first substrate may be substantially the same as a first substrate of FIG. 7F.

A lower polarizer and an upper polarizer may be attached on the first substrate and the second substrate.

Figure 9A:
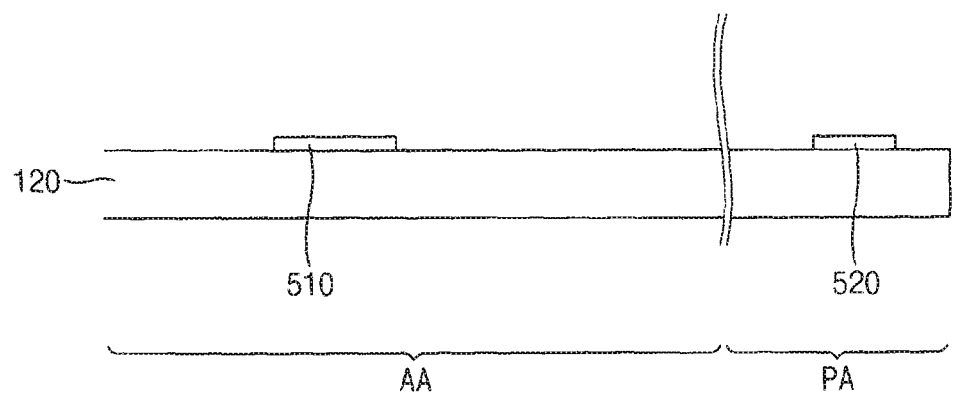
FIG. 9A and FIG. 9B are cross-sectional views illustrating a method of manufacturing the liquid crystal display panel of FIG. 3A.
Figure 9B:
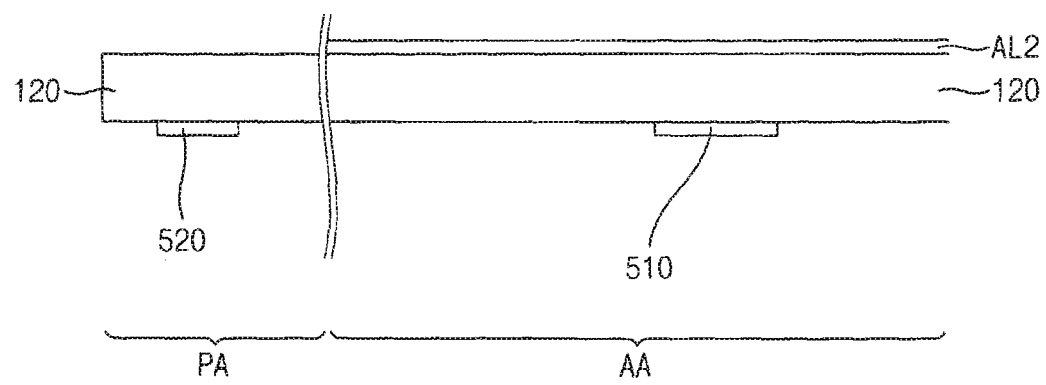

FIG. 9A and FIG. 9B are cross-sectional views illustrating a method of manufacturing the liquid crystal display panel of FIG. 3A.

Referring to FIG. 9A, a touch electrode 510, a connecting electrode 520, and a connecting line (refers to 530 of FIG. 3A) may be formed on a second base substrate 120. A transparent conductive layer may be formed on the second base substrate 120 and be patterned to form the touch electrode 510, the connecting electrode 520, and the connecting line. The transparent conductive layer may include indium tin oxide (ITO).

The touch electrode 510, the connecting electrode 520, and the connecting line may be formed via a high temperature process greater than 150° C. For example, the transparent conductive layer, including indium tin oxide, may be formed on the second base substrate 120 and be treated by an annealing process using a high temperature greater than about 150° C. to crystallize the indium tin oxide. The touch electrode 510, the connecting electrode 520, and the connecting line may have a lower surface resistance and a greater strength than indium tin oxide in the amorphous state that is made by a low temperature process, because of the crystallized indium tin oxide.

Referring to FIG. 9B, a second alignment layer AL2 may be formed on an opposite surface of the second base substrate 120 in the active area AA. The opposite surface is opposes a surface of the second base substrate 120 on which the touch electrode 510, the connecting line, and the connecting electrode 520 are formed. The second alignment layer AL2 may be formed by coating an alignment agent on the second base substrate 120.

After placing a first substrate to face the second substrate, a liquid crystal layer may be formed between the first substrate and the second substrate. Then, a sealing element may be formed to seal the liquid crystal layer. The first substrate may be substantially the same as a first substrate of FIG. 7F.

A lower polarizer and an upper polarizer may be attached on the first substrate and the second substrate.

Figure 10A:
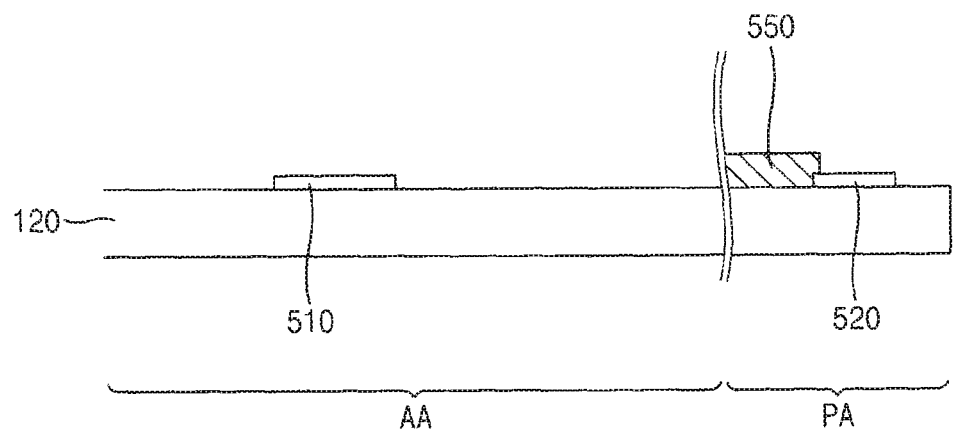
FIG. 10A and FIG. 10B are cross-sectional views illustrating a method of manufacturing the liquid crystal display panel of FIG. 4A.
Figure 10B:
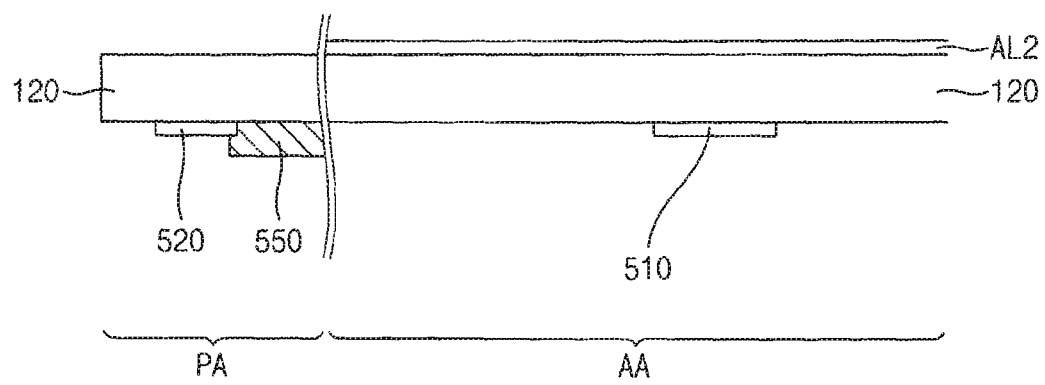

FIG. 10A and FIG. 10B are cross-sectional views illustrating a method of manufacturing the liquid crystal display panel of FIG. 4A.

Referring to FIG. 10A, a tough electrode 510, a connecting electrode 520 and a connecting line may be formed on a second base substrate 120. The inorganic insulation pattern 550 may be formed on the second base substrate 120 in a peripheral area PA, which is adjacent to a boundary of an active area AA to cover the connecting line. Thus, the connecting line may be protected from damage.

The inorganic insulation pattern 550 may include an inorganic insulation material. For example, the inorganic insulation pattern 550 may include silicon oxide ($SiO_x$) or silicon nitride $SiN_x$. The inorganic insulation pattern 550 may be formed via a high temperature process greater than 150° C. The inorganic insulation pattern 550 is stronger than an inorganic or organic insulation layer formed by a low temperature process. Thus, the inorganic insulation pattern 550 may effectively protect the connecting line from damage.

Referring to FIG. 10B, a second alignment layer AL2 may be formed on an opposite surface of the second base substrate 120 in the active area AA. The opposite surface opposes a surface of the second base substrate 120 on which the touch electrode 510, the connecting line, and the connecting electrode 520 are formed. The second alignment layer AL2 may be formed by coating an alignment agent on the opposite surface of the second base substrate 120.

After placing a first substrate to face the second substrate, a liquid crystal layer may be formed between the first substrate and the second substrate. Then, a sealing element may be formed to seal the liquid crystal layer. The first substrate may be substantially the same as a first substrate of FIG. 7F.

A lower polarizer and an upper polarizer may be attached on the first substrate and the second substrate.

Figure 11A:
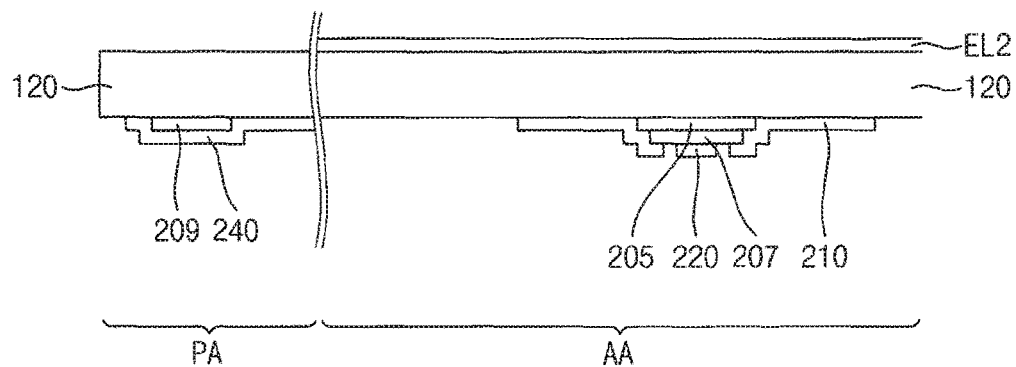
FIG. 11A and FIG. 11B are cross-sectional views illustrating a method of manufacturing the liquid crystal display panel of FIG. 5.
Figure 11B:
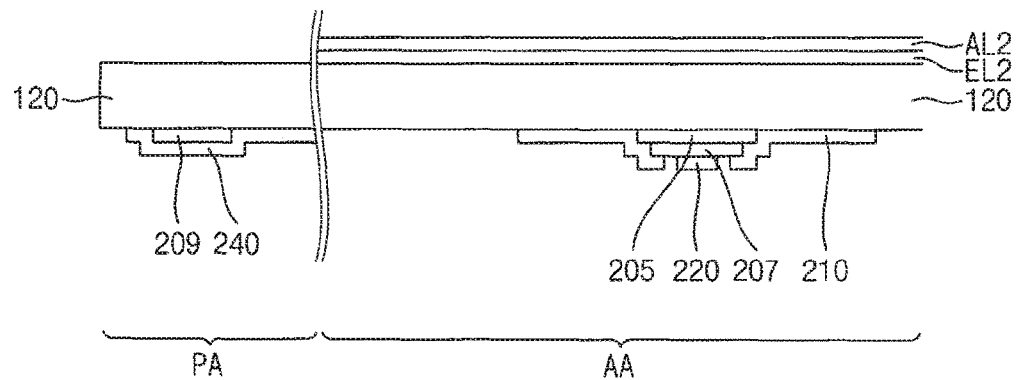

FIG. 11A and FIG. 11B are cross-sectional views illustrating a method of manufacturing the liquid crystal display panel of FIG. 5.

Referring to FIG. 11A, a bridge electrode 205, an insulation pattern 207, a router metal 209, a first tough electrode 210, a second touch electrode 220, a connecting electrode 240 and a connecting line may be formed on the second base substrate 120 as described with reference to FIGS. 7A to 7D.

A second electrode EL2 may be formed on an opposite surface of the second base substrate 120 in the active area AA. The opposite surface opposes a surface of the second base substrate 120 on which the first touch electrode 210, the second touch electrode 220, the connecting line, and the connecting electrode 240 are formed. The second electrode EL2 may include transparent conductive material. For example, the second electrode EL2 may include indium tin oxide (ITO). The second electrode EL2 may be formed via a high temperature process greater than 150° C.

Referring to FIG. 11B, a second alignment layer AL2 may be formed on the second electrode EL2 in the active area AA. The second alignment layer AL2 may be formed by coating an alignment agent on the second electrode EL2.

After placing a first substrate to face the second substrate, a liquid crystal layer may be formed between the first substrate and the second substrate. Then, a sealing element may be formed to seal the liquid crystal layer. The first substrate may be substantially the same as a first substrate of FIG. 7F.

A lower polarizer and an upper polarizer may be attached on the first substrate and the second substrate.

Figure 12A:
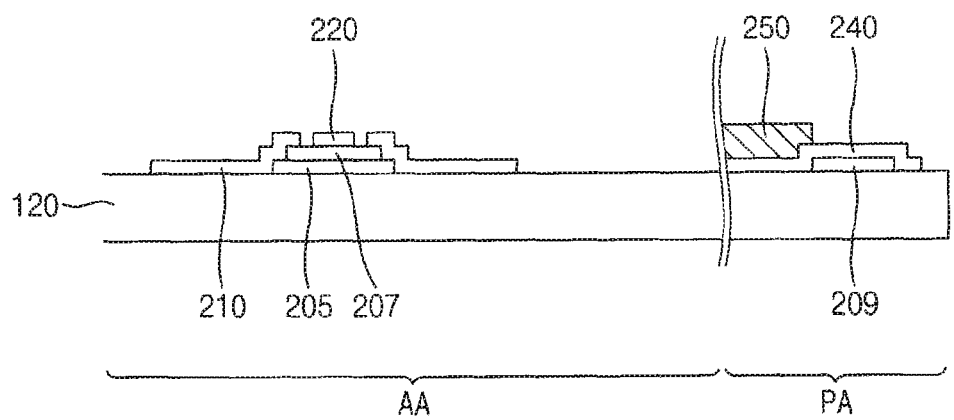
FIG. 12A, FIG. 12B, and FIG. 12C are cross-sectional views illustrating a method of manufacturing the liquid crystal display panel of FIG. 6.
Figure 12B:
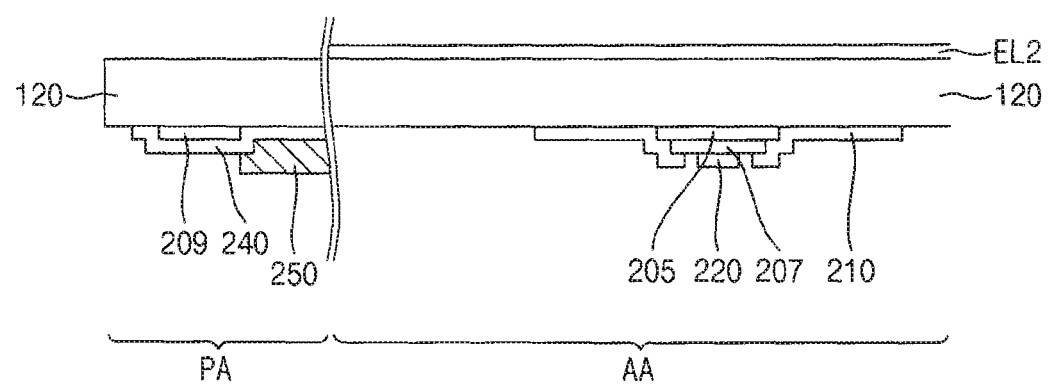
Figure 12C:
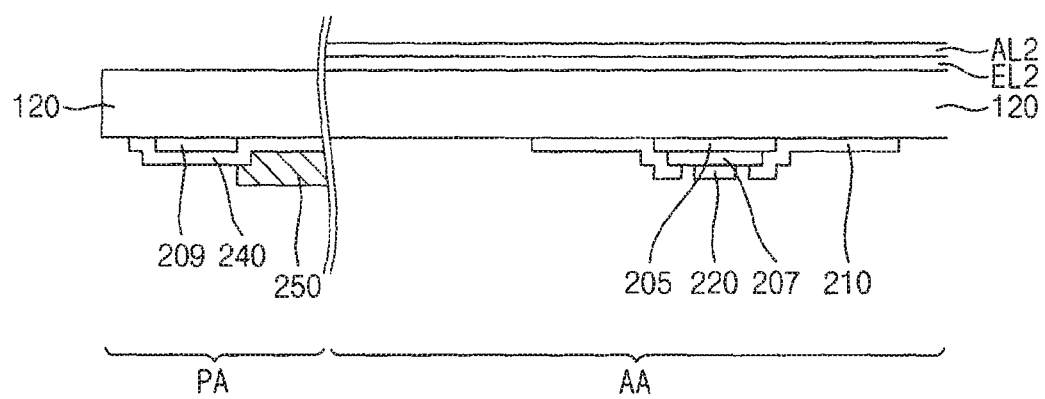

FIG. 12A, FIG. 12B, and FIG. 12C are cross-sectional views illustrating a method of manufacturing the liquid crystal display panel of FIG. 6.

Referring to FIG. 12A, a bridge electrode 205, an insulation pattern 207, a router metal 209, a first tough electrode 210, a second touch electrode 220, a connecting electrode 240, and a connecting line may be formed on a second base substrate 120. An inorganic insulation pattern 250 may be formed on the second base substrate 120 in a peripheral area PA which is adjacent to a boundary of an active area AA to cover the connecting line. Thus, the connecting line may be protected from damage.

Referring to FIG. 12B, a second electrode EL2 may be formed on an opposite surface of the second base substrate 120 in the active area AA. The opposite surface opposes a surface of the second base substrate 120 on which the first touch electrode 210, the second touch electrode 220, the connecting line, and the connecting electrode 240 are formed.

Referring to FIG. 12C, a second alignment layer AL2 may be formed on the second electrode EL2 in the active area AA. The second alignment layer AL2 may be formed by coating an alignment agent on the second electrode EL2.

After placing a first substrate to face the second substrate, a liquid crystal layer may be formed between the first substrate and the second substrate. Then, a sealing element may be formed to seal the liquid crystal layer. The first substrate may be substantially the same as a first substrate of FIG. 7F.

A lower polarizer and an upper polarizer may be attached on the first substrate and the second substrate.

According to the exemplary embodiments, a liquid crystal display panel may include a touch electrode and a connecting line which are formed through a high temperature process. Accordingly, the touch electrode and the connecting line may have relatively low surface resistance and have relatively high strength. Each of the touch electrode and the connecting line may be formed to have a relatively small thickness. Further, damage caused by repeatedly attaching a polarizing plate may be reduced, although each of the touch electrode and the connecting line has a relatively small thickness.

According to the exemplary embodiments, a color filter and a black matrix are included in a first substrate, and a second substrate is formed by processes independent from the first substrate. Thus, manufacturing of the second substrate which is capable of receiving touch input may be simplified.

According to the exemplary embodiments, an inorganic insulation pattern which is formed through the high temperature process covers a connecting line in a peripheral area, so that damage caused by repeatedly attaching a polarizing plate or caused by external shocks may be reduced.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of manufacturing a liquid crystal display panel, comprising:
   providing a first substrate comprising a first base substrate, a thin film transistor disposed on the first base substrate, a color filter disposed on the first base substrate, and a first alignment layer disposed on the thin film transistor and the color filter;

providing a second substrate formed independently from the first substrate, the second substrate comprising a second base substrate having a first surface and a second surface opposite to the first surface; and forming a liquid crystal layer between the first substrate and the first surface of the second substrate, wherein:

the providing of the second substrate comprises:
- forming a transparent conductive layer on the second surface by a high temperature process greater than 150° C.;
- forming a touch electrode and a connecting line connecting the touch electrode to a connecting electrode disposed in a peripheral area by patterning the transparent conductive layer;
- forming an inorganic insulation pattern on the connecting line; and
- forming a second alignment layer on the first surface;

the transparent conductive layer comprises indium tin oxide;

the indium tin oxide is treated by an annealing process performed at a temperature greater than about 150° C. to crystallize the indium tin oxide;

the transparent conductive layer has a thickness in a range of about 500 Å to 3000 Å; and the second alignment layer is formed when the second surface faces a substrate carrying device disposed below the second substrate and the substrate carrying device supports a bottom portion of the second substrate after the touch electrode, the connecting line, and the inorganic insulation pattern are formed.

2. The method of claim 1, wherein:

the providing of the second substrate further comprises:
- forming a bridge electrode on the second surface; and
- forming an insulation pattern overlapping the bridge electrode and exposing a portion of the bridge electrode; and the transparent conductive layer is formed on the second base substrate, the bridge electrode, and the insulation pattern.

3. The method of claim 2, wherein:

the second substrate comprises a first electrode and a second electrode as the touch electrode; and the forming of the touch electrode comprises patterning the transparent conductive layer such that the first touch electrode is electrically connected to the bridge electrode and the second touch electrode is separated from the first touch electrode and the bridge electrode.

4. The method of claim 1, wherein the second alignment layer is formed on the first surface by directly coating an alignment agent on the first surface.

5. The method of claim 1, wherein the forming of the touch electrode comprises patterning the transparent conductive layer to form the touch electrode in an active area, the connecting electrode in the peripheral area which is adjacent to a boundary of the active area, and the connecting line connecting the touch electrode to the connecting electrode.

6. The method of claim 1, wherein the inorganic insulation pattern is formed on a portion of the connecting line in the peripheral area.

7. The method of claim 1, wherein the inorganic insulation pattern is treated by an annealing process performed at a temperature greater than about 150° C.

8. The method of claim 1, wherein:

the providing of the second substrate further comprises forming a second electrode on the first surface; and the second alignment layer is formed on the second electrode.

9. The method of claim 1, further comprising attaching a lower polarizer and an upper polarizer onto the first substrate and the second substrate, respectively, after forming the liquid crystal layer.

10. The method of claim 9, wherein:

each of the lower and upper polarizer comprises an attachable and detachable adhesive layer; and the attaching comprises repeatedly attaching and detaching at least one of the lower or upper polarizer.

* * * * *